United States Patent
Witchalls

(10) Patent No.: US 7,197,030 B2
(45) Date of Patent: Mar. 27, 2007

(54) PROCESSING DEVICE NETWORK

(75) Inventor: Stewart R Witchalls, Salford (GB)

(73) Assignee: British Telecommunications public limited company, London (GB)

( * ) Notice: Subject to any disclaimer, the term of this patent is extended or adjusted under 35 U.S.C. 154(b) by 927 days.

(21) Appl. No.: 09/905,977

(22) Filed: Jul. 17, 2001

(65) Prior Publication Data
US 2001/0048678 A1 Dec. 6, 2001

Related U.S. Application Data

(62) Division of application No. 09/068,961, filed on May 20, 1998, now Pat. No. 6,407,996.

(30) Foreign Application Priority Data

Jul. 17, 1996 (GB) .................................. 9615029.7
Jul. 11, 1997 (WO) ..................... PCT/GB97/01884

(51) Int. Cl.
H04L 12/66 (2006.01)
H04L 12/28 (2006.01)
H04M 1/64 (2006.01)
H04M 5/00 (2006.01)
G06F 15/173 (2006.01)

(52) U.S. Cl. ...................... 370/356; 370/389; 370/392; 379/88.21; 379/265.09; 709/227

(58) Field of Classification Search ........ 370/352–356, 370/389, 392; 379/88.21, 157, 413.02, 265.09
See application file for complete search history.

(56) References Cited

U.S. PATENT DOCUMENTS

| 4,278,844 A | * | 7/1981 | Jones .......................... 379/157 |
| 5,550,916 A | * | 8/1996 | Daoud ................... 379/413.02 |
| 5,724,412 A | | 3/1998 | Srinivasan |
| 5,742,596 A | * | 4/1998 | Baratz et al. ................ 370/356 |
| 5,805,587 A | | 9/1998 | Norris et al. |
| 5,850,433 A | | 12/1998 | Rondeau |
| 5,862,134 A | | 1/1999 | Deng |

(Continued)

FOREIGN PATENT DOCUMENTS

EP 0 591 940 4/1994

(Continued)

OTHER PUBLICATIONS

Handley et al., "Session Invitation Protocol," Multiparty Session Control (MMUSIC), Internet Engineering Task Force, UCL/Caltech (Feb. 22, 1996), pp. 1-17.

Primary Examiner—Chi Pham
Assistant Examiner—Melanie Jagannathan
(74) Attorney, Agent, or Firm—Nixon & Vanderhye P.C.

(57) ABSTRACT

A network of processing devices is arranged to communicate by packets having an addressing header and a data portion. Within the network, audio telephony is implemented. A signaling packet is sent from a source processing device to a central location identifying a destination processing device. A signaling packet is sent from the central processing location to the destination processing device identifying the source processing device. A packet is supplied from the central location to the sourcing processing device identifying an address for the destination processing device, whereafter packets containing digitized audio signals are transmitted over said network directly between the source processing device and the destination processing device.

15 Claims, 16 Drawing Sheets

U.S. PATENT DOCUMENTS

| | | | |
|---|---|---|---|
| 5,867,562 A * | 2/1999 | Scherer | 379/88.21 |
| 5,884,032 A | 3/1999 | Bateman et al. | |
| 5,946,386 A * | 8/1999 | Rogers et al. | 379/265.09 |
| 5,970,126 A | 10/1999 | Bowater et al. | |
| 5,982,774 A | 11/1999 | Foladare et al. | |
| 6,011,794 A | 1/2000 | Mordowitz | |
| 6,069,890 A | 5/2000 | White et al. | |
| 6,108,704 A * | 8/2000 | Hutton et al. | 709/227 |
| 6,130,933 A | 10/2000 | Miloslavsky | |
| 6,243,373 B1 * | 6/2001 | Turock | 370/352 |
| 6,438,218 B1 * | 8/2002 | Farris et al. | 379/88.17 |

FOREIGN PATENT DOCUMENTS

| | | |
|---|---|---|
| WO | WO 91/05419 | 4/1991 |

* cited by examiner

Figure 1 "Prior Art"

"Prior Art"

"Prior Art"

Control Signals
(i) Call Control ⟶ Switch
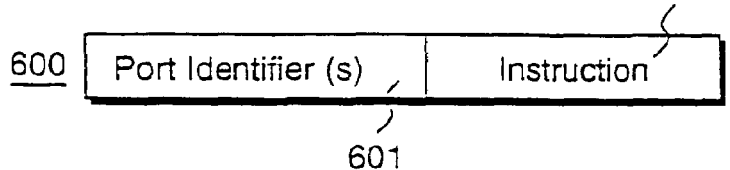
(ii) Switch ⟶ Call Control
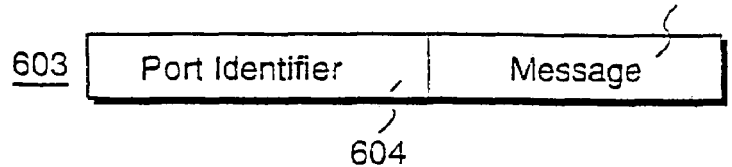
Instruction Signals
(iii) Switch ⟶ Computer
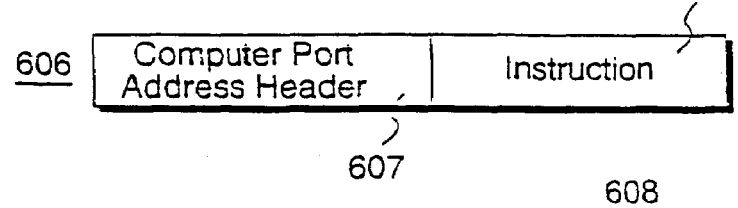
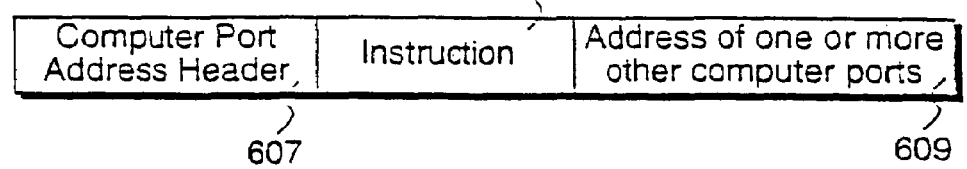
(iv) Computer ⟶ Switch
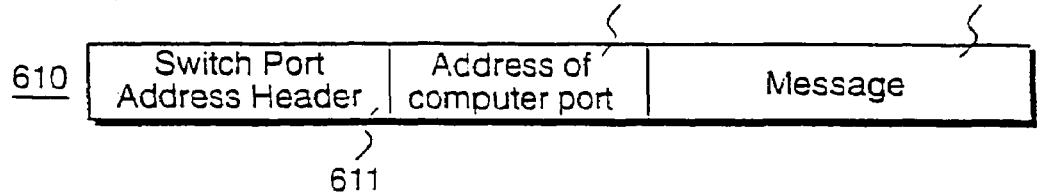
Figure 12

PROCESSING DEVICE NETWORK

RELATED APPLICATION

This is a divisional of my commonly assigned application Ser. No. 09/068,961 filed May 20, 1998 now U.S. Pat. No. 6,407,996.

BACKGROUND OF THE INVENTION

1. Field of the Invention

The present invention relates to a communications apparatus and a method of operating the same, and to a method of connecting a plurality of computer apparatus for communication with each other.

2. Related Art

It is known to provide a conventional personal computer or computer workstation with a microphone and an audio speaker operated by the processor of the personal computer or work station to allow voice communication between users of two such PCs or workstations. The facility of voice communication through a personal computer is known as an "Internet phone". Sound pressure waves produced by a person speaking at a first sending computer are converted by the microphone into an electronic audio signal which is digitized by the processor. The digitized signal is divided into shorter packet signals by the processor, which are transmitted over a communications link to the processor of a second receiving personal computer or workstation or the like, which reassembles the packet signals to reconstitute the audio signal. The audio signal is then used to drive an audio speaker of the receiving computer, producing an audible sound. Similarly, a microphone operated by the receiving computer converts a voice sound signal into an audio electrical signal, which is digitized by the processor of the receiving computer, packetized and sent over the communications link to the first computer. The processor of the sending computer reassembles the packetized signals into an audio signal which is used to drive the audio speaker associated with the first sending computer. The communications link may be a local area network, for example an Ethernet, an intranet of networks which are interconnected by a common protocol, or the global Internet evolved from the original ARPANET.

A network architecture for the transmission of data in data packets is detailed in International Patent Publication Number WO 91/05419. This provides for the combination of both audio voice and data to be distributed through the same switch using a common packet structure. It allows for the dynamic allocation of bandwidth but does not facilitate the setting up of audio voice communications in a manner which is familiar to anyone using conventional voice-based equipment.

Referring to FIG. 1 herein, there is shown schematically by way of example, a communication between a first personal computer 1 of the lap top variety having a microphone and a speaker, and a second, personal computer 2 also having a microphone and a speaker, via a communications link comprising a first modem 3, a telephone network 4, a second modem 5, the second modem 5 linked to the worldwide Internet 6 via an Internet service provider gateway 7 and the second personal computer 2 connected to the Internet 6 by a second service provider gateway 8.

A user of the first PC 1 is presented with an image of a telephone key pad on a display device 9 of the first PC. Under control of the processor of the first PC 1, the user can dial up an address of the second PC 2. The user of the second PC 2 can receive the packetized signals from the first PC, and voice communication between the first PC 1 and the second PC 2 is made, such that the user of the first PC can talk to the user of the second PC 2. Similarly, a packetized signal is sent from the second computer 2 to the first computer 1, so that a user of the second computer 2 can talk to the user of the first computer 1.

Referring to FIG. 2 herein, another example of use of Internet phones is shown, within a local area network (LAN). A plurality of computers are connected at a site by a local area network consisting of a communications link comprising an ethernet cable eg a co-axial cable or a twisted pair. A user of one PC 10, connected to the LAN, may use the Internet phone facility to communicate with the user of another PC 11, connected to the LAN. Computers connected to the local area network may access a wide area network (WAN) or an intranet of connected networks via a gateway computer, for example the computer 12 in FIG. 2.

In each of the examples described with reference to FIGS. 1 and 2 herein, a sound pressure wave signal is converted to an electronic data signal by a microphone, which is then digitized and packetized, and transmitted over the physical communications links, for example the ethernet cable and the cables connecting internet sites, the transmission between computers being made in accordance with one or more protocols.

For communication across an Internet or the global Internet, messages are transferred over a number of communications links between a number of computers. Communication between a sender computer and a receiving computer is made in accordance with a point-to-point protocol (PPP) and each computer may support a range of such protocols. Referring to FIG. 3 herein an individual voice packet signal containing voice data, and produced by an application program which converts a voice signal to a plurality of signal packets, is provided with a first header signal 31 by a first protocol. The first header signal contains information in the form of bytes of data added to the packet signal 30. For example where the first header signal is added to the packet signal in accordance with the sequence to packet exchange (SPX) protocol, packet sequencing information may be included in the header signal to ensure that the packet signals arrive in order, and a handshaking protocol is included, to ensure that as packets are received by the receiving computer the receiving computer acknowledges receipt of the packet signals.

Whilst some protocols, such as the SPX protocol are reliable for sending packet signals over an LAN, other protocols are less reliable. For example the Internet packet exchange (IPX) protocol sends packet signals over a network independently of each other. In FIG. 3 herein the IPX protocol takes the first header signal 31 and the packet signal 30 and treats this as a composite packet signal 32, to which is added an IPX protocol header signal 33.

The IPX protocol makes a "best effort" to deliver the packet signal to the address specified in the header signal 33, but it cannot guarantee delivery because it does not include error detection or correction. The IPX protocol defines a hierarchical address structure that, within reason, is independent of the underlying physical network. This independent structure allows packet signals to be routed between networks and passed over dissimilar physical networks. However, the IPX protocol relies upon the underlying network, or other layers of protocol to provide reliable delivery. Where packet signals are sent over an incompatible network, the packet signals are encapsulated in header signals that are compatible with the network, in accordance with a protocol which is compatible with the particular section of network which is to be traversed. For example an IPX headed packet can be encapsulated in a user datagram protocol (UDP) header and then in an Internet protocol (IP) header in order to tunnel the IPX packet through a transmission control protocol\Internet protocol (TCP\IP) network.

In a TCP\IP network, the Internet protocol defines a datagram ie the basic unit of information signal transmitted over the TCP\IP network, and defines the addressing used by TCP\IP, thereby routing the packet signals. The user datagram protocol (UDP) is the TCP\IP transport protocol used for packet delivery. The UDP does not have the overhead of creating connections and verifying delivery.

Referring to FIG. 4 herein, as another example of encapsulation of packet signals by protocol headers, the SPX and IPX protocols can be replaced by a single NetWare protocol header signal. A packet signal 40 having a NetWare header signal 41 may be encapsulated by the UDP and IP protocol headers signals 42, 43 respectively for transmission over the global Internet. By encapsulating packets of signals and sending them over the Internet, Internet phones can communicate with each other.

Prior art Internet phones operate on the basis that the sending computer must know the address of the receiving computer so that the sender knows where to address the packet signals to, and the receiving computer must know the address of the sending computer in order to send packet signals to the sender. Communication between individual computers is point-to-point, in that a single computer sends and receives packet signals to another single computer. The received packet signals are re-assembled into voice signals by the processors.

In contrast to the packet signal environment of Internet phones, a conventional telephone communications system operates by creating channels over which electronic signals representing either voice or other data can be sent. The use of communications channels allows great flexibility of services, allowing features such as call diversion, (allowing a call to be automatically diverted to another location), and call conferencing, (allowing communication between three or more telephones). Examples of handling of conference calls by a conventional private branch exchange (PBX) call centre connected to a public service telephone network (PSTN) are illustrated with reference to FIG. 5 herein.

In FIG. 5, a private branch exchange call centre 50 connects a plurality of individual telephones 101, 102, 103 and 104. Other telephones 201, 202 and 203 which are not connected to the PBX can be accessed through the public service telephone network (PSTN) 55 the PBX call centre. Interactions between telephones are handled by the conventional PBX by connection of channels. For example, in a first service interaction problem, where a first telephone 101 connected to the PBX builds a conference with second and third telephones 201, 202 respectively each connected to the PSTN, the first telephone 101 calls the second telephone 201, thereby opening a first channel between the first telephone 101 and the second telephone 201, the first telephone 101 calls the third telephone 202, thereby opening a second channel between the first telephone 101 and the third telephone 202. Then the first and second channels are connected by forming a bridge in the PBX call centre, between the second and third telephones, which are off the PBX, in the PSTN. Where the first telephone user wishes to exit the conference, the user of the first telephone can clear the first telephone from the conference and communication between the second telephone 201 and the third telephone 202 resumes via an end-to-end call across the PBX. Thus, two telephones which are in the PSTN are connected together via a link in the PBX, whilst none of the telephones associated with the PBX are participating in the call. This is an inefficient use of resources from the point of view of the PBX.

Alternatively, the first telephone 101 may exit the conference by transferring the call to another telephone. This can be done by a consultation call transfer. That is, if the PBX has an active call from for example the second telephone 201 through a first channel, and a held call from for example the third telephone 202 through a second channel, the first telephone 101 can join the active call with the held call and then drop out of the conference itself.

In order to connect the second telephone 201 with the third telephone 203, there must be a bridge within the PBX linking the first and second channels. There are now three telephones which are off the PBX. First telephone 101 has dropped out, second telephone 201 is part of the PSTN, and third telephone 203 is also part of the PSTN. This is a waste of the REX resources since the REX is used to connect two telephones which are off the REX. Alternatively, a user of the first telephone 101 can perform a single step transfer to exit the conference. This occurs where the first telephone 101 has an active call with the second telephone 201 over a first channel, and the first telephone 101 calls the third telephone 203. over a second channel, which starts to ring. At that point, the first telephone drops out, and the second telephone hears a ringing tone. The single step transfer is also inefficient, because two of the parties in the conference, the user of the first telephone 101 and the user of the second telephone 201, each hear a ringing tone, when they should be talking to each other.

Another example of a service interaction carried out by a conventional channel connecting PBX is as follows. A telephone 104 connected to the PBX calls another telephone 103 also connected to the PBX. The other telephone 103 does not answer, but other telephone 103 has a "divert on no answer" function set directing the call to a third telephone 102, also on the PBX, so the call diverts to the third phone 102, using up a bridge in the PBX.

In a third example of a service interaction, first telephone 102 and second telephone 103 are connected to the PBX. First telephone 102 calls second telephone 103, but second telephone 103 is engaged with an active call. Since first telephone 102 has a "call waiting" facility, first telephone 102 waits for second telephone 103 to become available. If second telephone 103 has a "divert on no answer" function, there is a problem in determining whether first telephone 102 is diverted to another telephone from second telephone 103. A problem is whether the "divert on no answer" function causes the "call waiting" function to be affected. In some manufacturers' telephones, the "call waiting" function is affected by the "divert on no answer", whereas in other manufacturers' telephones, the "call waiting" function is not affected. Thus, two telephones connected to a PBX can appear to behave differently to each other, depending upon the model and manufacturer of the telephone.

The above conferencing examples rely upon the method of switching and connecting channels using the conventional REX. Since conventional Internet telephones operate on a point-to-point basis, in a packet sending Internet telephone environment there is a problem in implementing call conferencing as found on the conventional channel switching network. Internet telephones rely upon point-to-point communication, whereas the conventional REX relies upon channel switching and channel connection. In the Internet telephone environment, no channels which exist for the duration of the call are created between telephones, whereas in the conventional REX environment, dedicated channels are connected between different telephones which exist for the duration of the call. There is a problem in implementing standard telephone network facilities in an internet telephone environment due to the difference between the packet signal sending environment and the channel switching environment.

An example of a particular problem in connecting Internet telephones, as compared with connection via a PBX channel switching environment is as follows. Referring to FIG. 6 herein, four telephones 60, 61, 62, 63 are connected to each other in conference via a bridge 64. The bridge 64 is a piece of hardware comprising the PBX, to which all the telephones involved in the conference connect to via a single connection point. Bridges are effective in connecting telephones, for example four telephones can be connected together in a conference by a single bridge 64, as shown in FIG. 6. Bridges reduce the number of connections which need to be made in a conference, which in turn reduces the amount of bandwidth required in sending electronic voice signals around the conference. To implement a similar system using conventional Internet telephones, as shown in FIG. 7 herein is more complicated. Because the Internet telephones operate on a point-to-point basis, there needs to be a bi-directional link between each telephone and every other telephone in the conference. Where only two telephones are present, there needs to be a single link. Where three telephones are present, there need to be three links. Where four telephones are included in the conference, there are required six bi-directional links, and where five telephones are included in the conference, there are required ten bi-directional links. The number of links required increases disproportionally with the number of telephones in the conference.

The number of point-to-point connections required to implement a conference on conventional Internet telephones quickly increases as the number of Internet telephones in the conference rises. If a conference were to be built between Internet phones in implementing the conference each Internet telephone needs to know the address of each other Internet telephone in the conference, leading to a high complexity of addressing information processing required at each individual Internet phone.

SUMMARY OF THE INVENTION

According to a first aspect of the present invention, there is provided, in a network of processing device arranged to communicate by means of packets having an addressing header and a data portion, a method of implementing audio telephony, comprising steps of sending a signalling packet from a source processing device to a central location identifying a destination processing device; sending a signalling packet from said central location to said destination processing device identifying said source processing device; sending a packet from said central location to said source processing device identifying an address or said destination processing device; and transmitting packets containing digitized audio signals over said network directly between said source processing device and said destination processing device.

In a preferred embodiment, a packet from the source processing device is sent to the central location identifying a telephone off-hook condition. In response to receiving the off-hook condition, a central location may supply a dial tone alert to the source in response to receiving the off-hook condition. Preferably, the source processing device requests dial tone in response to receiving the dial tone alert.

According to a second aspect of the present invention, there is provided a central switching processor networked to a plurality of user processing devices arranged to communicate by audio telephony, comprising means for receiving a signalling packet from a source processing device identifying a destination processing device; means for sending a signalling packet to said identified destination processing device identifying said source processing device; and means for sending a packet to said source processing device identifying an address for said destination processing device, so that said source processing device may communicate directly with said destination processing device.

In a preferred embodiment, said processor includes means for supplying a dial tone alert packet to a source processor in response to receiving an indication of a telephony off-hook condition from said source processor. Preferably, the central switching processor includes means for sending a ringing alert signal to a destination processing device identifying a condition to the effect that said source processing device is attempting to establish a call to said destination processing device.

According to a third aspect of the present invention, there is provided a central switching processor networked to a plurality of user processing devices arranged to communicate by audio telephony, comprising means for receiving a signalling packet from a source processing device identifying a first destination processing device; means for sending a signalling packet to said identified destination processing device identifying said source processing device; means for receiving a second signalling packet identifying a second destination processing device; and means for establishing a conference communication wherein packets received from any of a plurality of processing devices are relayed to all other processing devices established within said conference.

Preferably, the central switching processor includes means for supplying a dial tone alert packet to said source processor in response to receiving an off-hook condition.

According to a fourth aspect of the present invention, there is provided a networked processing device arranged to communicate by means of packets having an addressing header and a data portion, including means for establishing audio telephony over said network, said processing device comprising means for sending a signalling packet to a central location identifying a telephony off-hook; means for receiving a dial tone alert packet in response to said off-hook condition; means for requesting an audible dial tone in response to said dial toner alert; and means for identifying a destination processing device to said central location.

BRIEF DESCRIPTION OF THE DRAWINGS

For a better understanding of the invention, and to show how the same may best be carried into effect, reference will now be made to the accompanying diagrammatic drawings, which illustrate examples of preferred embodiments and preferred methods of the invention, and in which:

FIG. 12 illustrates signal types transmitted and received in accordance with a first specific method of the present invention;

DETAILED DESCRIPTION OF THE PREFERRED EMBODIMENTS

Figure 1:
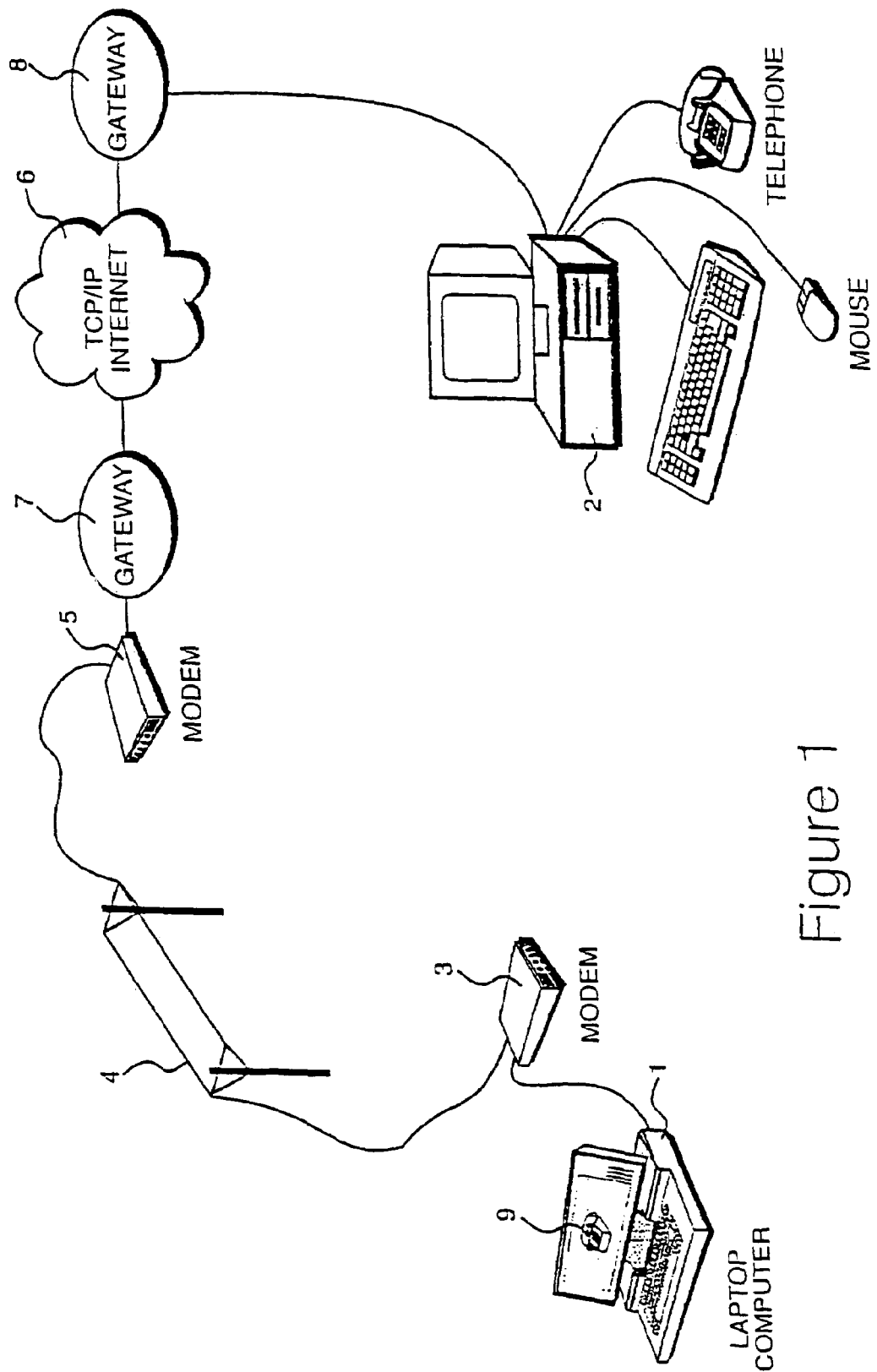
FIGS. 1–7 depict various prior art telephony arrangements.
Figure 2:
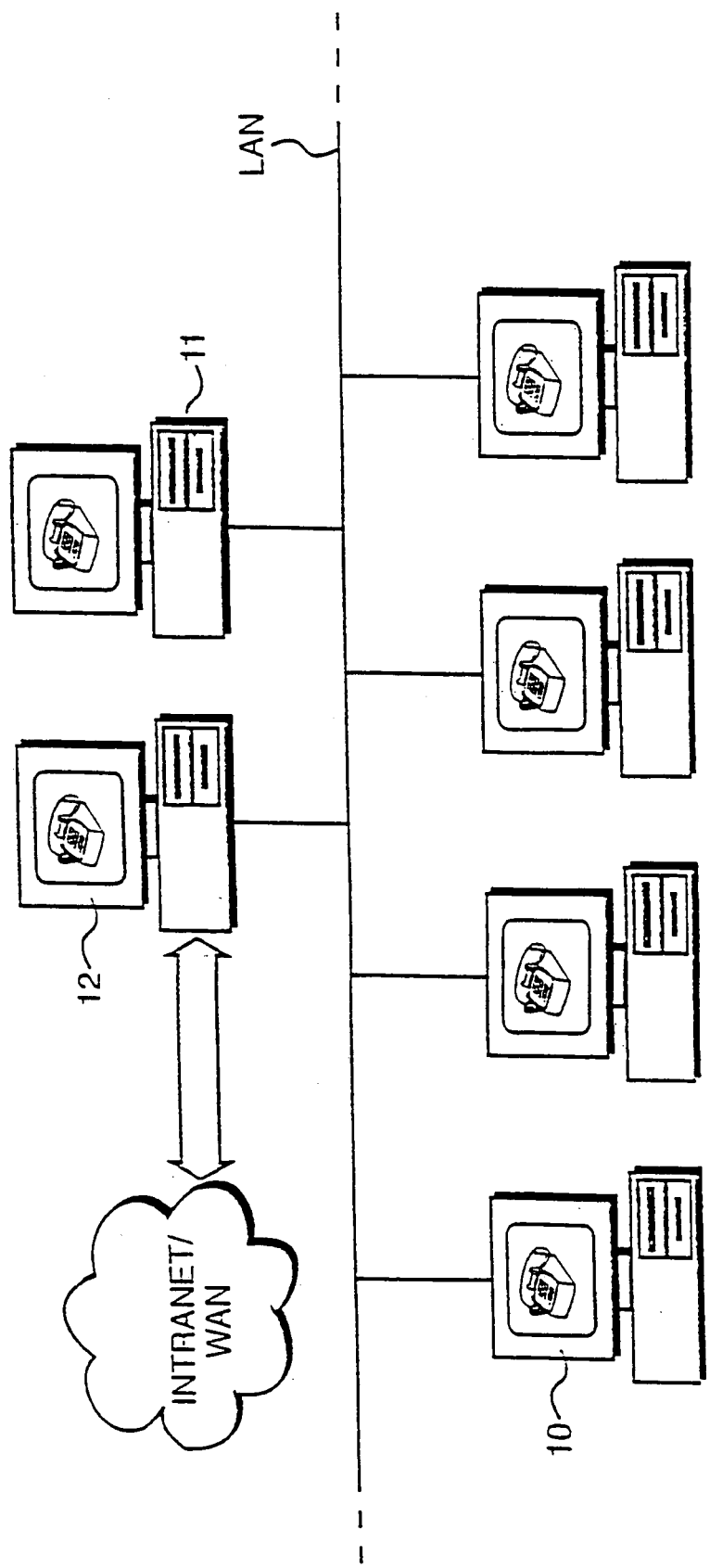
Figure 3:
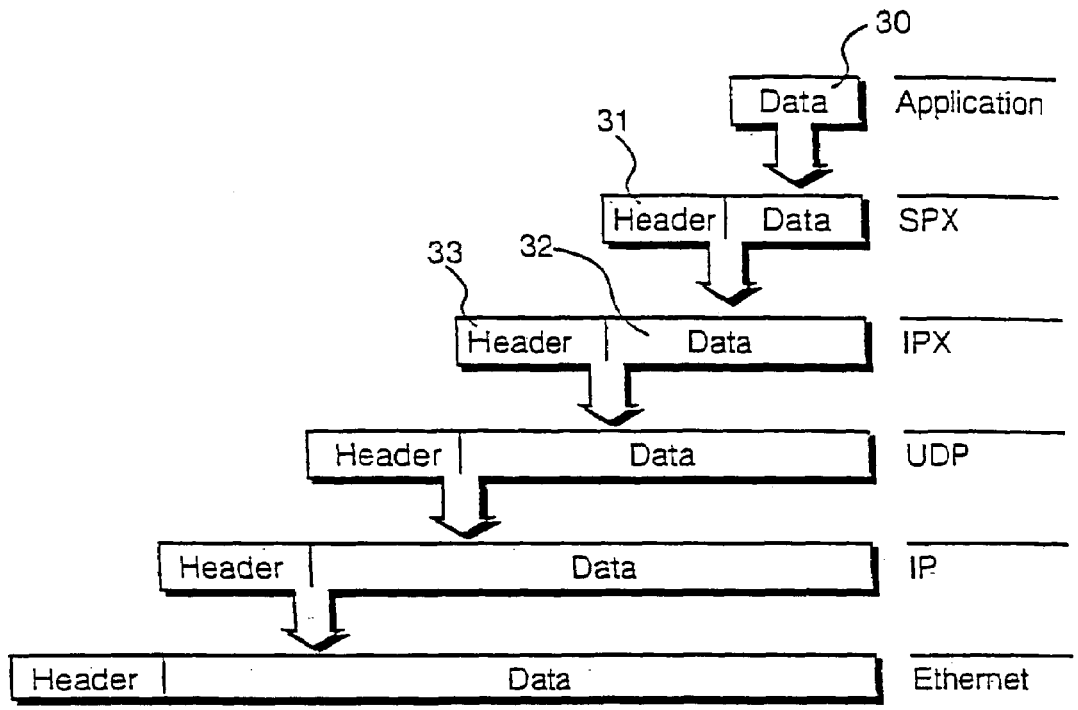
Figure 4:
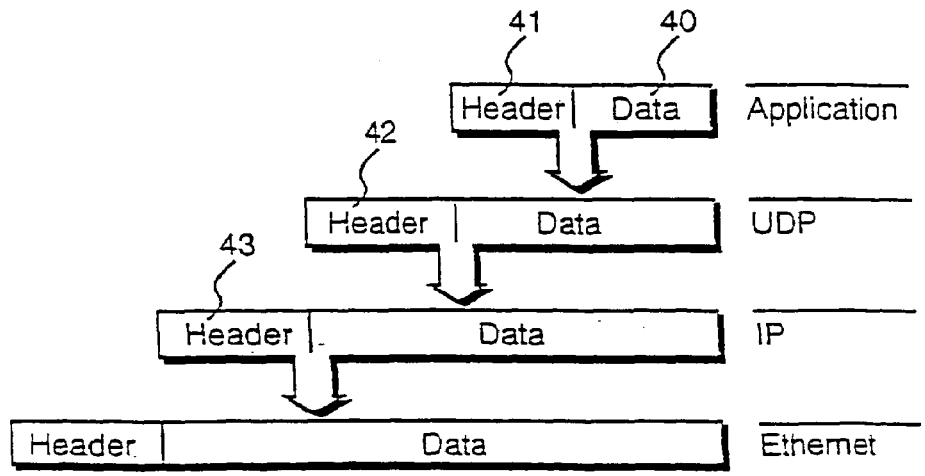
Figure 5:
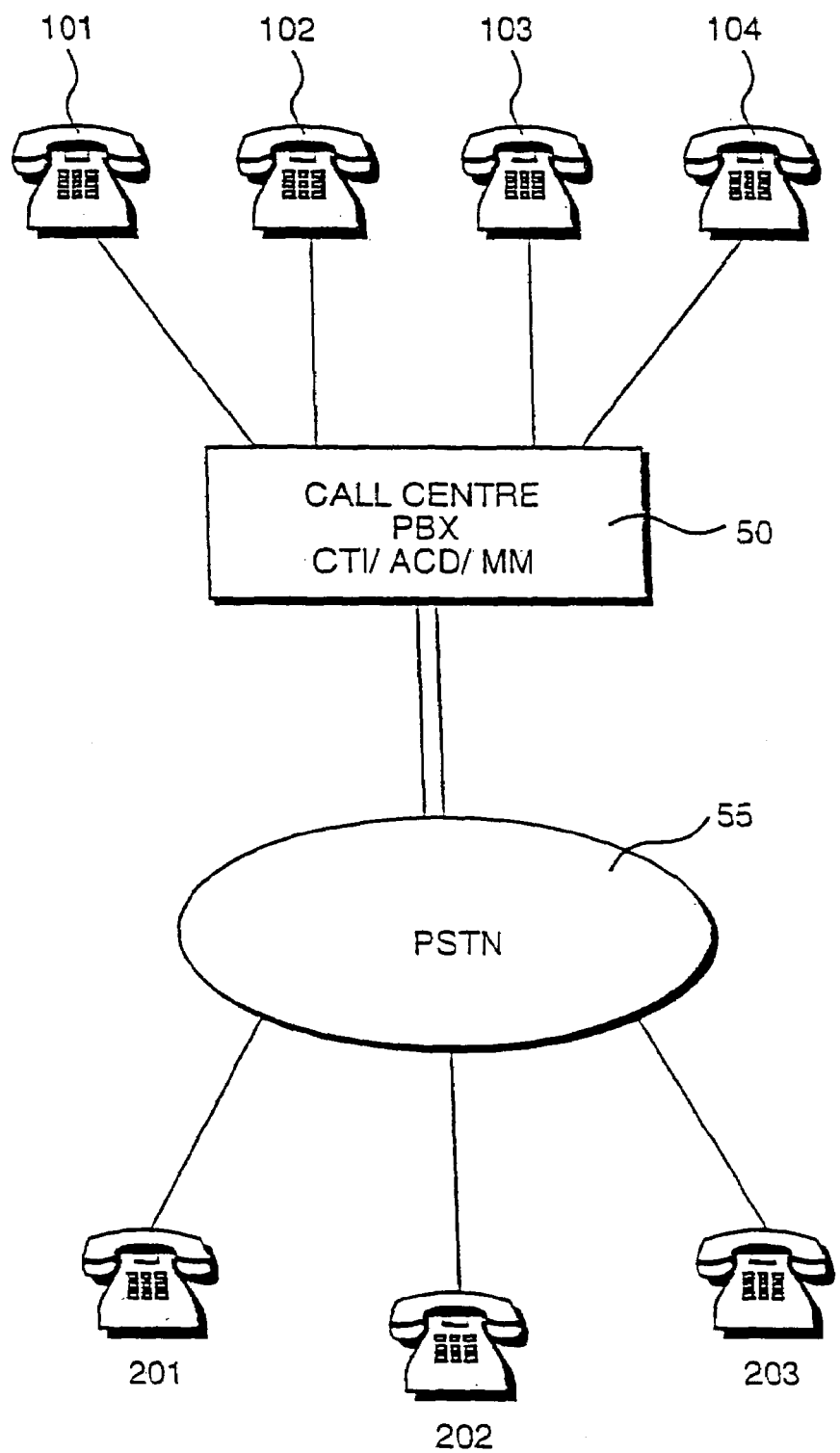
Figure 6:
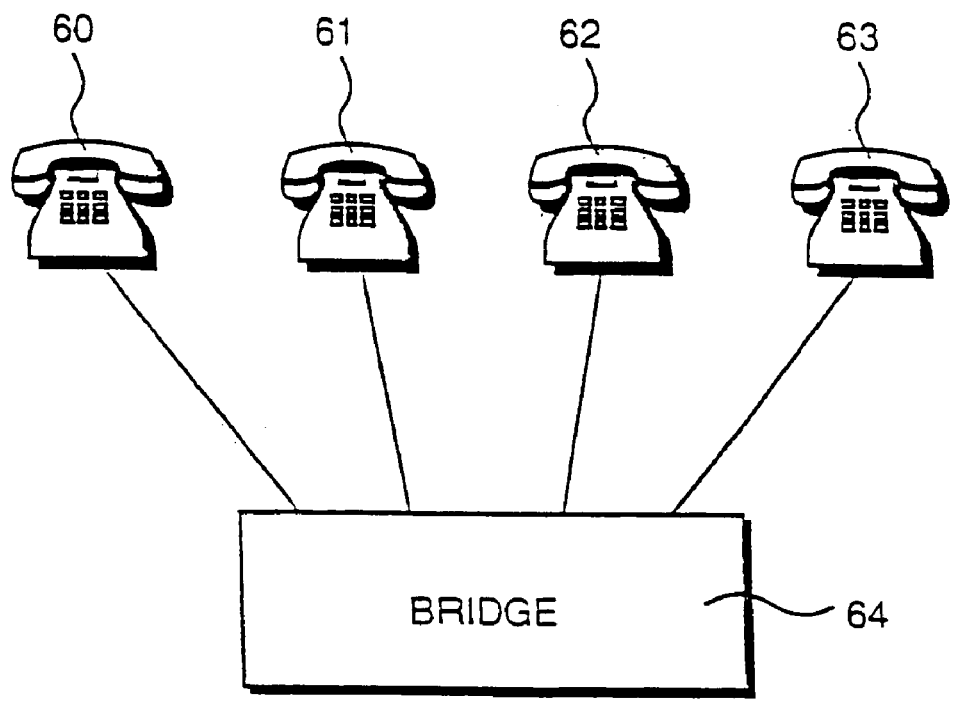
Figure 7:
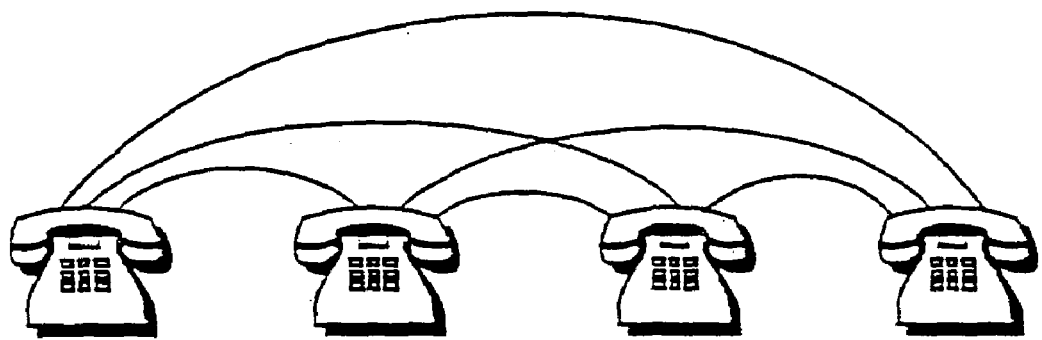
Figure 8:
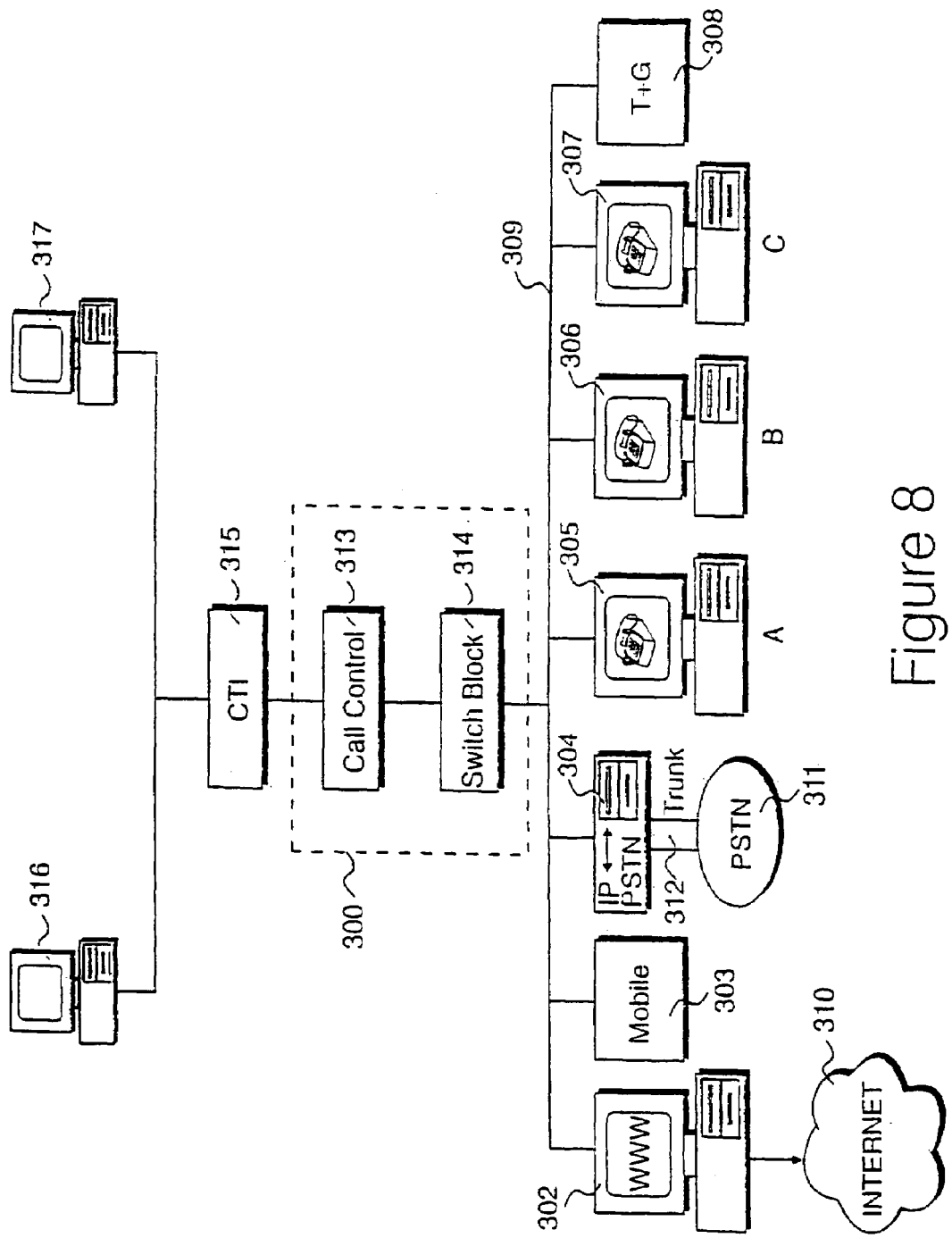
FIG. 8 shows an overview of a communications network according to a first specific embodiment of the present invention.

Referring to FIG. 8 of the accompanying drawings, there is shown a communications exchange apparatus for implementing communications connections between a plurality of computers 302–308 connected by a local area network 309, for example an ethernet in the form of co-axial cable or twisted wire pair. Each computer has at least one communications port physically connected to the LAN. Each of the plurality of computers 302–308 are networked using a conventional ethernet protocol, in which each port has its own specific address.

Computers may communicate with each other on a point-to-point basis over the local area network 309 via their communications ports. For example, computer 305 having port address A may communicate with computer 307 having port address C, provided computer 305 knows the port address C in order to communicate with computer 307. The computers may communicate with each other by sending packetized telephone frequency signals over the local area network 309 in accordance with conventional local area network protocols, implementing conventional Internet telephone communications between computers on the local area network.

Communication may be made by computers on the network, for example computers 303 and 305–307 via gateways to other communications systems. For example, computer 302 comprises a gateway to the Internet 310 for example through an internet protocol to world-wide-web gateway (IP-WWW). Access to the public switched telephone network (PSTN) 311 can be made via a communications port of an internet protocol to PSTN gateway computer 304 connected to the PSTN over a trunk line 312. The communications exchange apparatus 300 comprises a call control apparatus 313 and a switch apparatus 314. The call control apparatus controls the connection of communications between the computers 302–308 by way of control signals passed between the call control apparatus 313 and the switch apparatus 314. The switch apparatus 314 implements the connection of communications between the individual computers 302–308, by supplying instructions signals to the computers, directing individual computers to connect with one or more other individual computers, and by the switch apparatus 314 supplying the appropriate port addresses of the other computers to which a particular computer is to connect.

The communications exchange apparatus 300 interfaces to a computer telephony integration unit 315 (CTI) which allows one or more exchange monitoring computers 316, 317 to make telephony requests to call control and to allow computers 316, 317 to gain information from call control concerning which communications connections are in existence.

Figure 9:
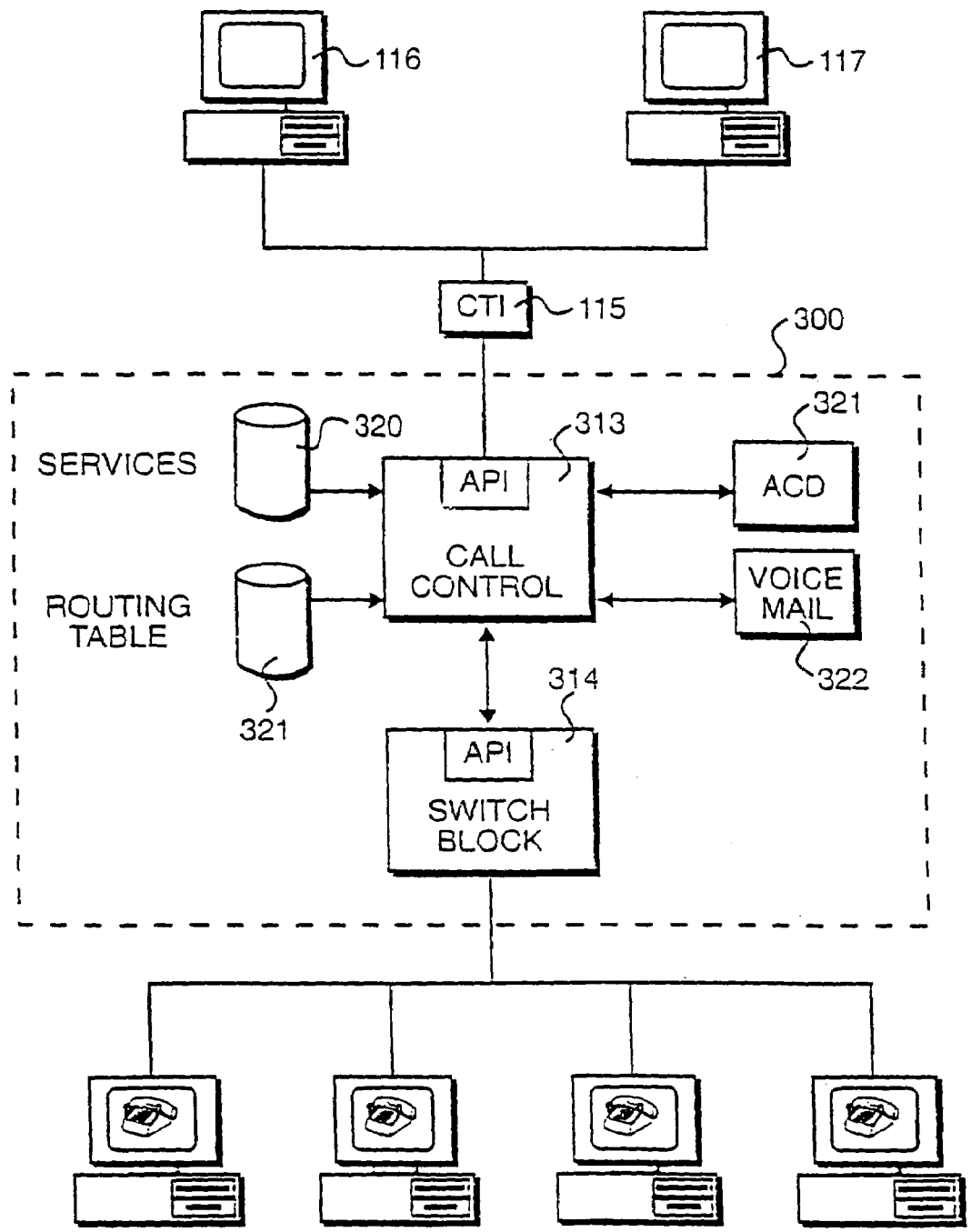
FIG. 9 shows a communications exchange apparatus comprising the network of FIG. 1.

Referring to FIG. 9 herein, there is shown in more detail the communications exchange apparatus 300. The communications exchange apparatus 300 may comprise a service database 320 in the form of a hard disk memory which stores information signals relating to available telephony services and their configurations, for example configurations for conferencing, call diversion, call waiting, and divert on no answer services; a routing table database 321 in the form of a memory device, which the call control can interrogate for detailing communications call routing information; and one or more high level services server devices, for example an ACD server device 322, and a voice mail server device 323, each of which passes messages to and from the call control.

Figure 10:
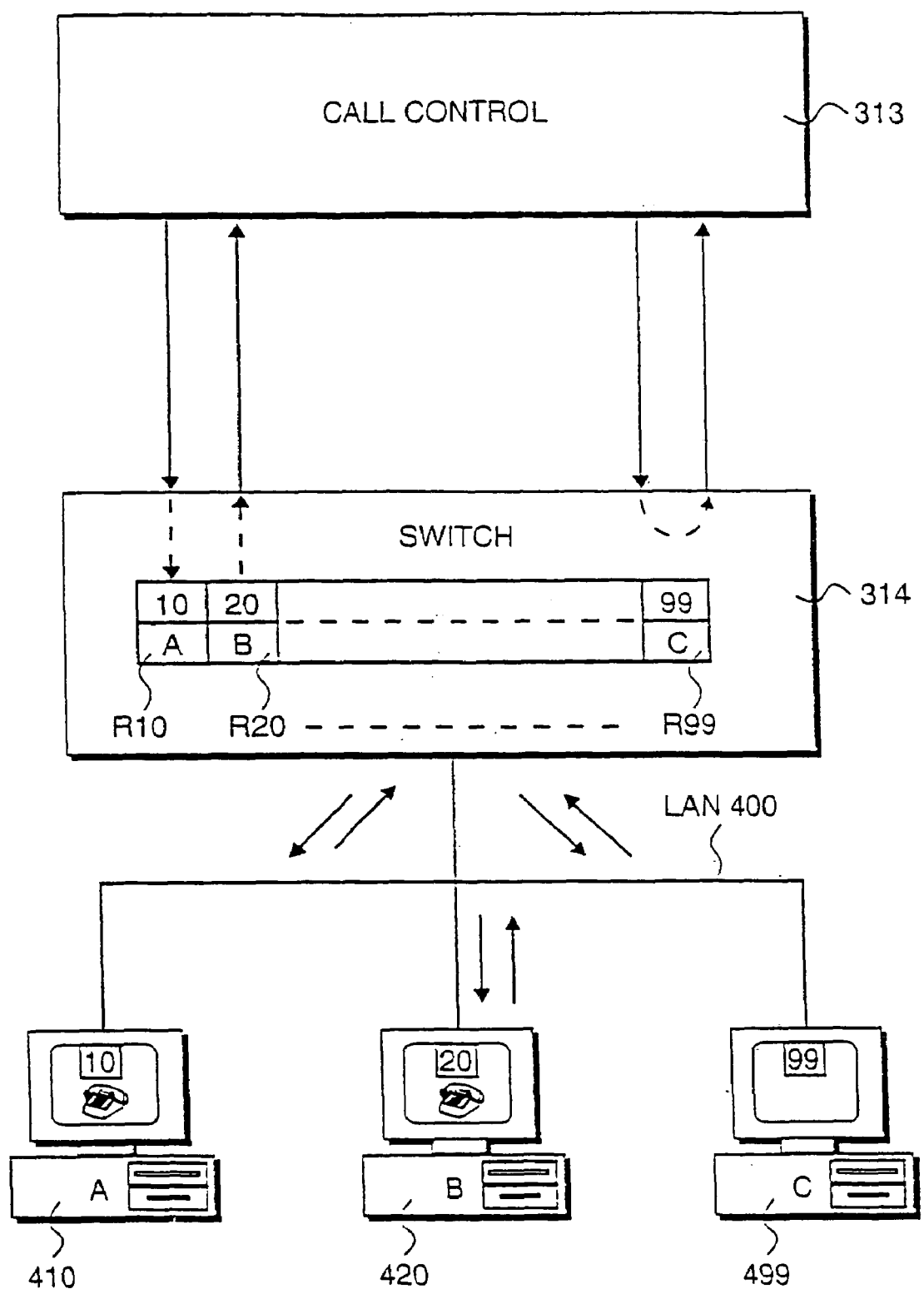
FIG. 10 illustrates an architecture of the communications exchange apparatus of FIG. 9.

Referring to FIG. 10 herein, there is shown the call control apparatus 313 and the switching apparatus 314 and an example of their interaction with a plurality of computers 410, 420 and 499 having respective ports 10, 20 . . . 99 at port location addresses A, B and C, the plurality of computers capable of communicating with each other and with the switch apparatus 314 across a local area network 400 through their communications ports. The switch apparatus 314 comprises a register of a plurality of memory locations R10, R20 . . . R99. Each register memory location is capable of storing a port identifier signal identifying a port, and a corresponding port address signal, of a communications port of a computer. For example register memory location R10 may store an address signal A of a port 10 of first computer 410 along with a port identifier signal identifying the port as port 10.

Memory location R20 may store an address signal B of a second computer 420 along with a port identifier signal identifying the port as port 20. Register location R99 may store an address signal C of an nth computer 499 along with a port identifier signal identifying port 99. The call control 313 communicates with the switch 314 by means of control signals, which identify the ports by their port identifiers. The switch communicates with the individual computers by means of instruction signals which identify port addresses.

Figure 11:
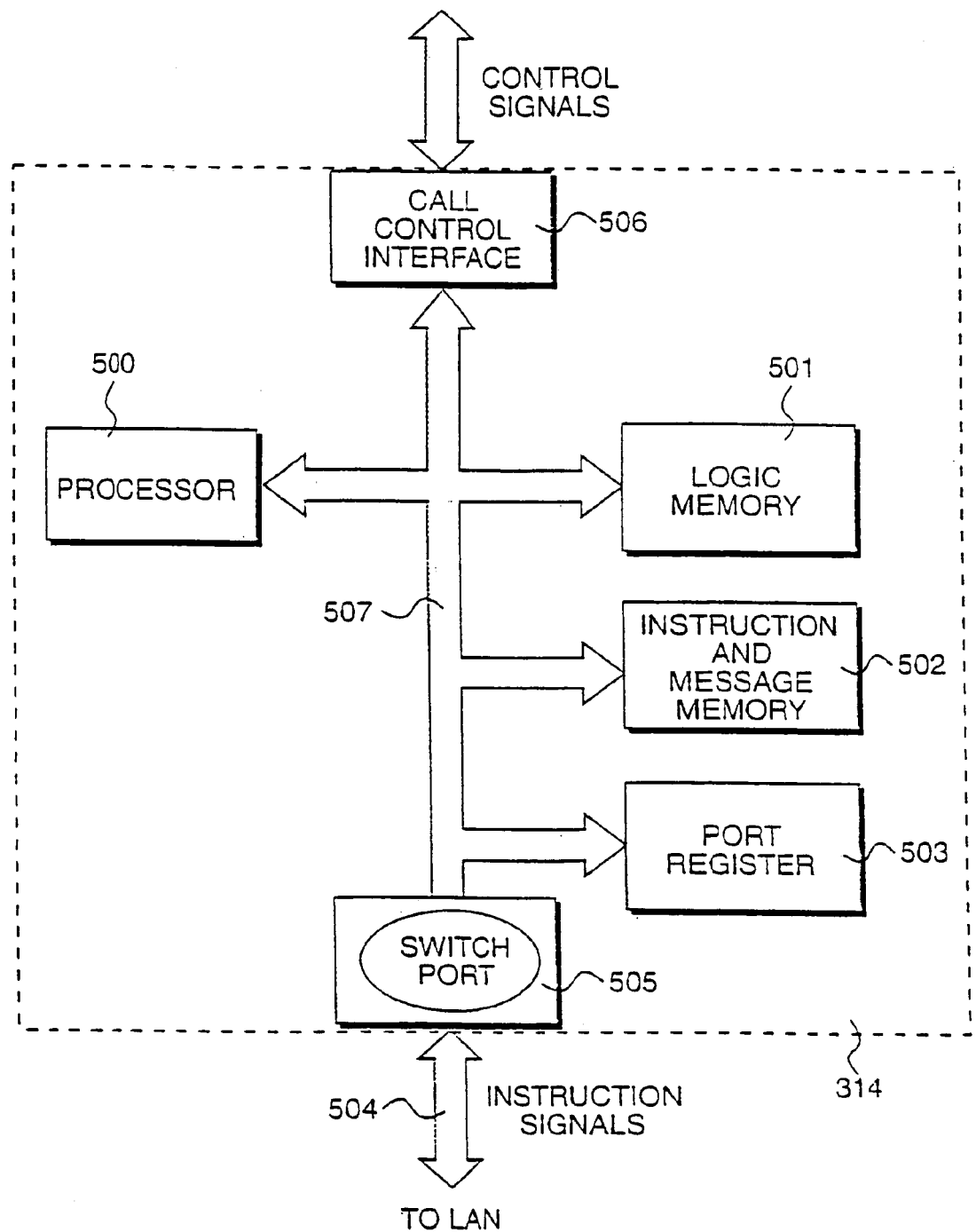
FIG. 11 illustrates an embodiment of a switch apparatus.
Figure 13:
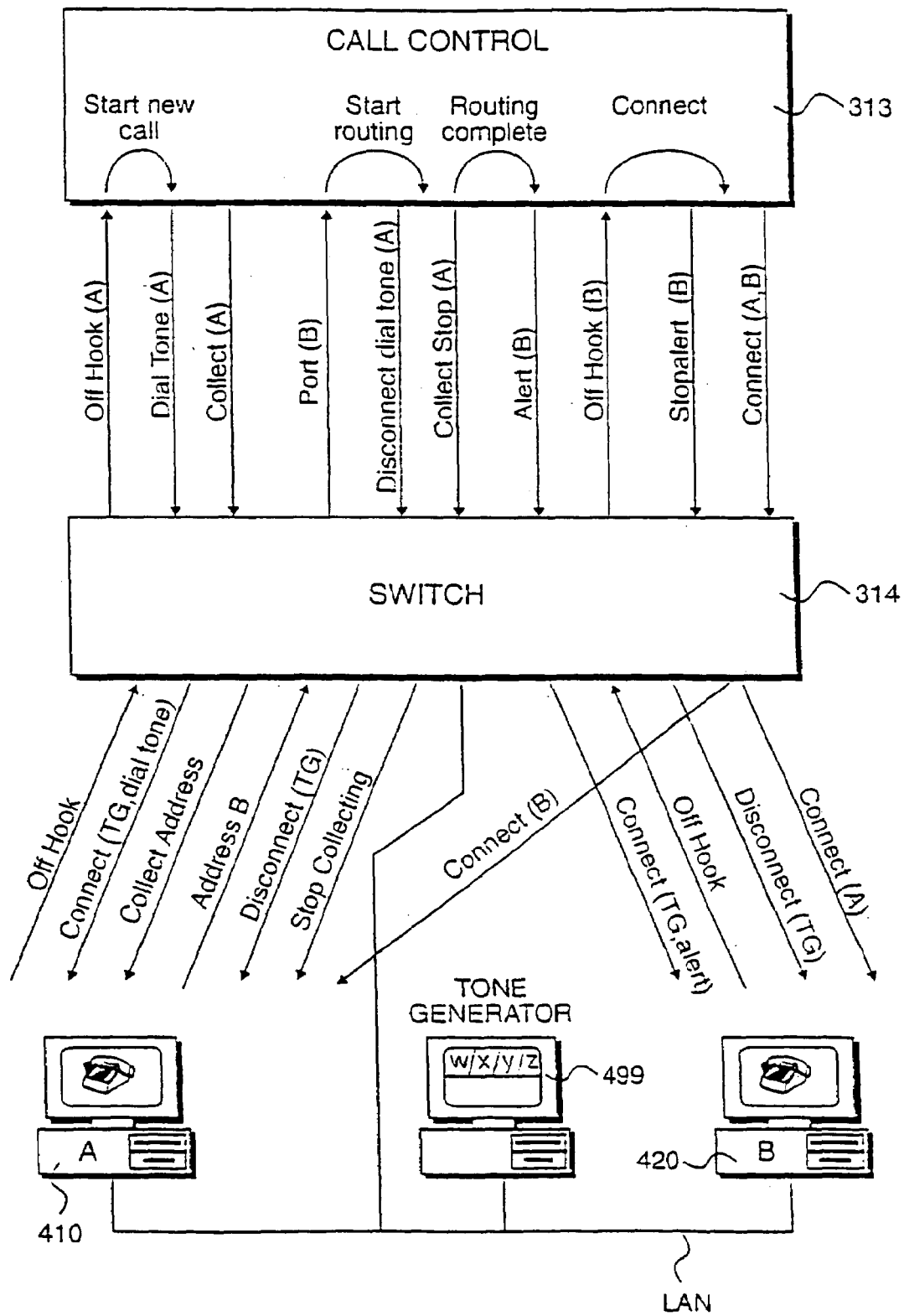
FIG. 13 illustrates an example of an operation of the communications apparatus of FIG. 8.
Figure 14A:
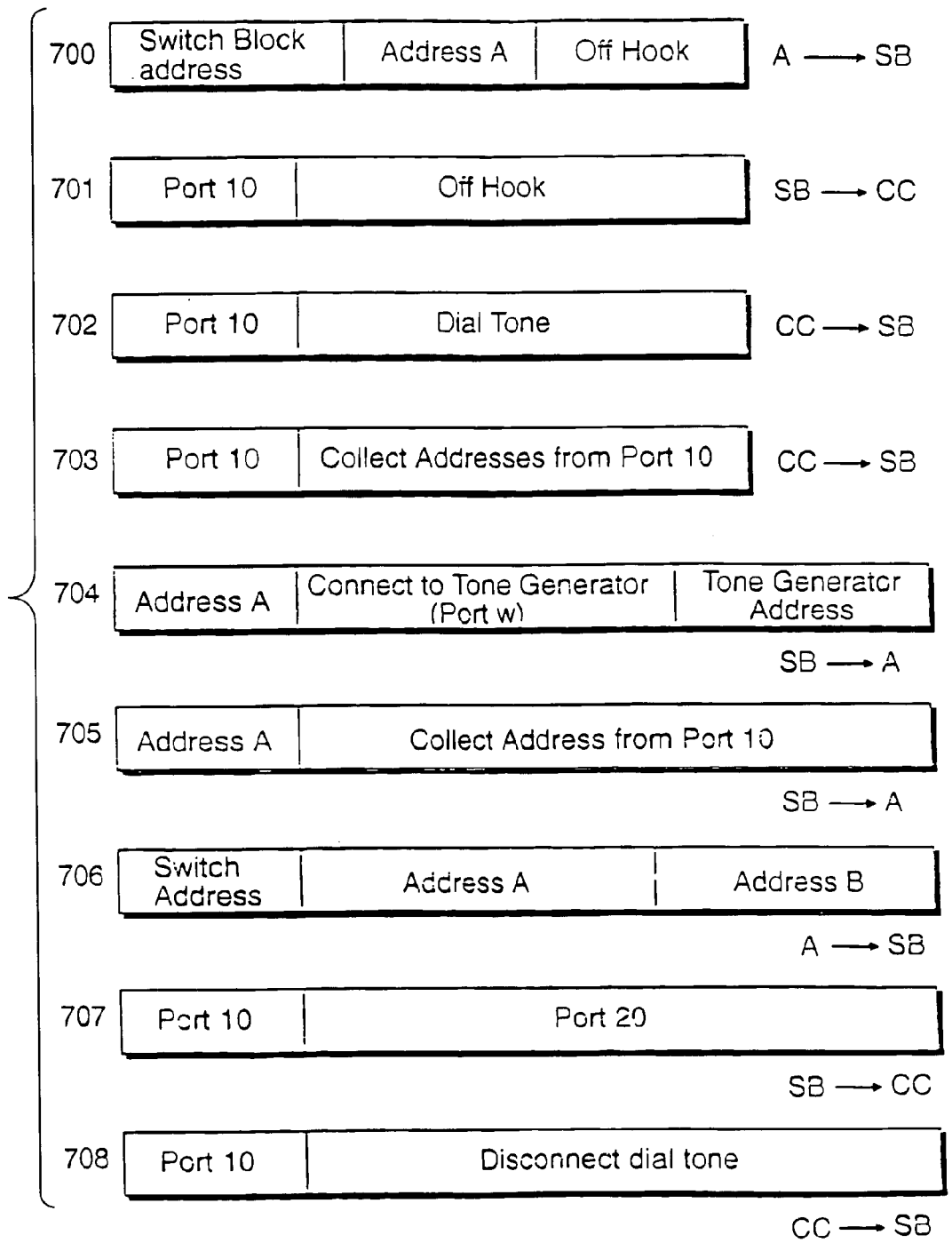
FIGS. 14A, 14B and 14C illustrate an example of signal communications in the apparatus of FIG. 13.
Figure 14B:
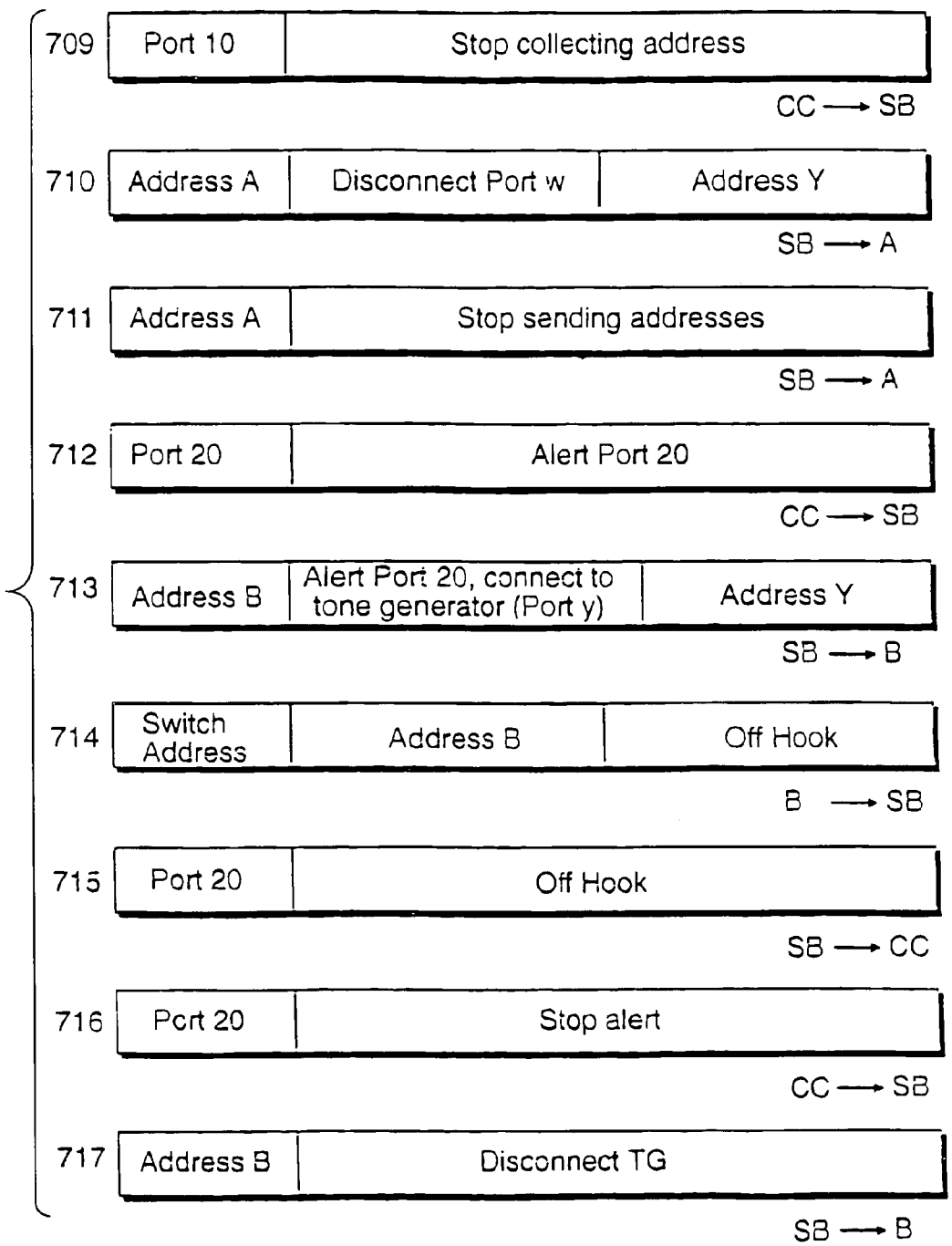
Figure 14C:
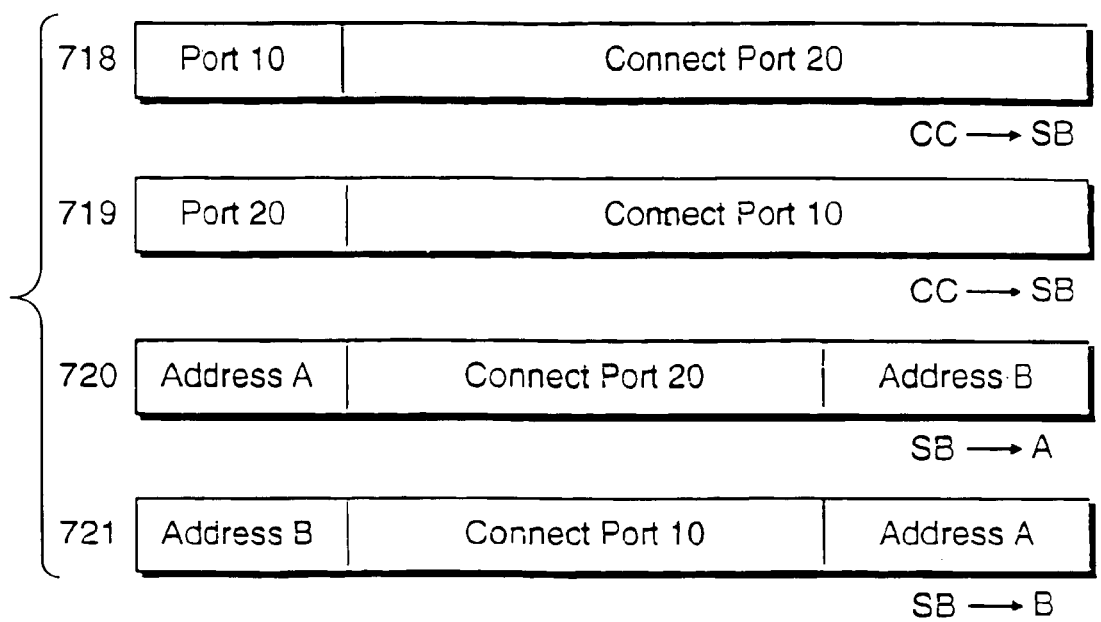

Referring to FIG. 11 herein, there is shown schematically one embodiment of a switch apparatus described in functional blocks. The switch 314 comprises a processor 500; a logic memory 501 for storing logic instructions for operating the processor; an instructional and message memory 502 for storing instructions and messages to be sent and received by the switch; a port register 503 for storing port identification signals and port addresses received from computers connected to a communications network 504, eg a LAN; a switch communications port 505 for accessing the network, the port having a switch port address; a call control interface 506 for sending and receiving messages to and from the call control apparatus 313; and an internal bus 507 linking the above elements. The call control interface 506 sends and receives control signals to and from the call control 313. The switch communications port 505 sends and receives instruction signals over the network 504.

The processor 500 interprets received call control signals and received instruction signals, in accordance with logic instructions, stored as logic signals in logic memory 501, packages up appropriate instructions and messages stored in the instruction and message memory 502 for sending to communications ports identified from the port address signal and port identification signal stored in the port register 503, and sends the instructions signals to computer ports specified by the received call control signals and logic instructions. The processor 500 also reports instructions and messages received as instruction signals through the switch port 505 to the call control via the call control interface 506 as control signals sent from the switch to the call control.

Referring to FIG. 12 herein, a control signal 600 from the call control to the switch comprises a port identifier signal element 601, which identifies a port, eg port 10 and an instruction signal element 602. The port identifier element 601 identifies a port to which an instruction issued by the call control is to apply. A control signal 603 passing from the switch apparatus to the call control comprises a port identifier signal element 604 and a message signal element 605. The port identifier 604 enables the call control to identify the source port of the message signal 605.

The switch apparatus 314 communicates with the plurality of computers through a set of instruction signals. An instruction signal 606 from the switch apparatus to a computer comprises an address header signal element 607 and an instruction signal element 608. The address header signal 607 enables the instruction signal 608 to be sent to the selected communications port of the computer to which the instruction is to apply. The instruction signal 608 comprises an instruction to the corresponding computer to perform an operation. For example, an instruction signal from the switch 314 to a first computer 410 may instruct the first computer 410 to connect a communications channel over the network 400 with a third computer 499.

An instruction signal from the switch 314 to the first computer 410 may instruct the first computer 410 to send a port address of another computer, for example the second computer 420 at address B to the switch apparatus. The instruction signal element 608 may instruct a computer to connect communications to a dial tone signal present on a dial tone signal server port, for example a port on the computer 499. Another instruction signal element 608 may instruct a computer to disconnect communications to the dial tone signal port. An instruction signal 608 may instruct the computer to implement a communications connection to ports of one or more computers of the plurality. The instruction signal element may instruct a computer to disconnect from ports of one or more other computers, or may comprise an alert signal alerting a computer that the computer is about to be addressed. Where the instruction signal from the switch apparatus to the computer requires the computer to connect communications with one or more other computers, the address or addresses of those one or more other computers are specified in the instruction signal as an address identifier signal element 609.

An instruction signal 610 from a computer to the switch apparatus comprises a switch port address header signal 611 which routes the signal to the switch apparatus over the network, an address identifier signal element 612 which identifies the address of the computer sending the instruction signal, and a message signal element 613 specifying a message from the computer to the switch apparatus. The message may comprise a status message, for example an off-hook signal informing the switch apparatus that the computer wishes to communicate with one or more other computers, an address signal, supplying an address of either communications port of the computer itself, or ports of one or more other computers to which the computer wishes to communicate with, the address signal supplied to the switch apparatus over the network 400; or an on-hook signal, specifying that the computer has terminated communications with one or more other computers.

In operation, each computer registers its port address and port identification, eg port 10, port 20 etc, with the switch apparatus 314. The address of each computer port is stored at a respective register location, and the switch keeps a register of ports connected on the network, together with their respective addresses. The switch apparatus itself has a port location address on the network. Each computer of the plurality of computers needs to store: its own port address signal and port identification signal; a port address signal of the switch apparatus; an instruction signal protocol for sending to and receiving from instruction signals from the switch apparatus 314.

Additionally, each computer, to communicate with other computers across the network needs to store a network protocol for connecting directly across the network with other computers, for example a conventional point-to-point protocol for sending packetized telephone frequency signals to other computers, in order to implement an internet telephone facility. By telephone frequency signals, it is meant normal internet telephone services, for example voice communication, fax communication, e-mail communication, or video link communication. Telephone frequency signals are packetized into packets and sent between individual computers of the plurality across the network 400.

The call control apparatus 313 determines and directs which computer(s) communicates with which other computer(s), in response to messages received from one or more said computers. For example a message sent from the first computer 410 to the switch apparatus 314, as an instruction signal is converted by the switch apparatus 314 to a message to the call control as a control signal in accordance with the prestored logic in the logic memory 501. Call control 313 determines which ports are to be connected or disconnected with each other, and sends control signals to the switch apparatus 314 instructing which ports are to be connected to which other ports.

Each computer has one or more respective ports, and connections between ports instructed by the call control, perhaps in response to a message received from a computer are implemented as direct connections of communications ports between individual computers across the LAN by the switch apparatus 314 through instruction signals sent between the switch apparatus 314 and the computers.

Referring to FIGS. 13 and 14A–14C herein, there will now be described an example of call set-up between first and second computers 410, 420 at computer addresses A and B respectively, as implemented by the switch apparatus 314 under control of the call control apparatus 313.

First and second computers 410, 420 are each equipped with Internet telephones. Each Internet phone is resident at a communications port at the respective computer. For example the first computer 410 has a first Internet phone resident at port 10 at location address A. Second computer 420 has a second Internet phone resident at port 20 on the second computer at port location address B. A third computer 499 has a tone generator capable of producing a plurality of different tones, for example a dial tone, a ring tone, an alert tone, a call waiting tone, each tone resident at a respective port on the third computer, for example at port addresses w, x, y, z respectively. Each computer registers its port identifier, 10, 20, dial tone, ring tone, alert tone, call wait, and their corresponding addresses A, B, w, x, y, z, with the port register 503 of the switch apparatus by sending signals to the switch.

A communications connection can be initiated from the first computer by a user at the first computer wishing to communicate by Internet phone with a user of the second computer 420, in response to a keyboard input from the user of the first computer. An instruction signal 700 is sent from port 10 of the first computer to the switch over the LAN, the instruction signal comprising a message that the first computer is off-hook and wishes to communicate with one or more other computers. The switch 314 relays the off-hook message to the call control apparatus by sending a control signal 701 to the call control apparatus 313. The call control apparatus decodes the control signal including the off-hook message in accordance with a set of preprogrammed logic stored in the call control apparatus, and initiates control signals 702, 703 transmitted back to the switch apparatus 314. The control signals include a dial tone instruction signal and a collect address instruction signal specifying port 10.

The switch 314 implements sending the instructions to port 10 by converting the dial tone instruction and collect instruction into instruction signals 704, 705 which are transmitted from the switch apparatus over the LAN 400 to address A of the first computer 410. The switch converts the incoming information port 10 in the control signals 702, 703 to respective addresses A, B, by looking up the respective addresses of the port identifiers port 10, port 20 in the port register 503. The switch receives the control signals addressed to port 10, looks up the location address of port 10 on the first computer and transmits the corresponding instruction signals containing the dial tone instruction and containing the collect instruction, addressed to port 10 of the first computer at address A. The first computer receives the instruction signals instructing it to connect port 10 to the dial tone port of the tone generator on the third computer 499. The dial tone port address w of the third computer is supplied to the first computer 410 in the instruction signal 706 sent from the switch apparatus.

The first computer connects over the LAN 400 to the respective dial tone port on the tone generator of the third computer 499 at address w and receives dial tone signals across the LAN 400 which are played audibly to the user of the first computer 410. In response to the collect address instruction signal 705 sent from the switch apparatus, the first computer 410 collects an address, for example by the user inputting an address B of the port 20 of the second computer 420 via a keyboard of the first computer 410. Alternatively, the user of the first computer may know an abbreviated address of the port 20 of the second computer, for example a character string "JOE" which may be matched up with the full Internet address of port 10 of the second computer 420, at the first computer 410, or at the switch apparatus 314.

In response to the collect address instruction signal 705 sent from the switch apparatus 314, the first computer 410 transmits the address B to the port of the switch apparatus over the LAN 400 in an instruction signal 706 comprising a switch address header signal element and an address signal element. The switch apparatus transmits a control signal 707 to the call control apparatus 313 the signal 707 comprising a port identifier, identifying port 10 as the origin of the message, and a message, in this case the message being port 20, indicating to the call control apparatus that port 10 has supplied the address B of port 20. The pre-programmed logic in the call control apparatus interprets the control signal 707 as indicating that port 10 wishes to communicate with port 20 and commences routing of the communications connections by transmitting control signals 708 and 709 to the switch apparatus 314. The control signal 708 identifies port 10 as the destination of an instruction to disconnect port 10 from the dial tone generator.

The switch apparatus 314 implements the control signal 708 by sending out an instruction signal 710 over the LAN 400 to the first computer 410, the instruction signal 710 including an address header and an instruction to the first computer to disconnect from the dial tone generator on the third computer 499. The first computer 410 implements the disconnect instruction by disconnecting communication over the LAN 400 to the tone generator on the third generator 499, and audible dial tone at the first computer 410 is terminated. The switch apparatus 314 implements the control signal 709 containing instruction to stop collecting address by transmitting an instruction signal 711 over the LAN 400 to the first computer 410 containing the instruction to stop collecting address, which the first computer 410 implements by terminating transmission of the address B over the LAN 400 to the switch apparatus 314. The call control apparatus 313 implements routing of the connection between port 10 and port 20 in accordance with predetermined logic stored in a memory device of the call control, and in response to signals received from the routing table database 321 with the result that the call control issues a control signal 712 identifying port 20 and containing the instruction to alert port 20.

The switch apparatus 314 implements the control signal 712 by sending an instruction signal 713 over the LAN 400 to the port 20 of the second computer. The instruction signal 713 comprises an address header addressing the signal to a location address B of the port 20 of the second computer, an instruction signal element comprising the instruction to alert the second computer that a call is to be connected, and an instruction to the second computer for the second computer to connect to the alert tone generator port of the third computer 499. The instruction signal 713 also comprises an address signal element supplying the address y of the port of the third computer 499 on which the tone generator is resident.

In response to the instruction signal 713 the second computer 420 communicates with the ringing tone port of the tone generator on the third computer 499 and receives ringing tone signals over the LAN 400, which result in an alert tone being audibly transmitted at the second computer 420, alerting a user of the second computer 420 that a call is incoming. When the user of the second computer responds to receive a call, by operation of a keyboard, microphone, handset or similar, the second computer 420 transmits an instruction signal 714 to the switch apparatus notifying the switch apparatus that the second computer is off-hook and is ready to receive a call. The off-hook message is relayed by the switch apparatus in the form of a control signal 715 specifying the port 20 and the off-hock message.

On receipt of the off-hook message the control apparatus 313 in accordance with the predetermined logic stored in the call control, sends a stop alert control signal 716 to pert 20 which is converted by the switch apparatus to a disconnect tone generator instruction signal 717, sent over the LAN 400 to the second computer 420. The disconnect tone generator instruction signal comprises an address header addressing the signal to the port 20 of the second computer 420 at address B, and an instruction signal element instructing the computer to disconnect communication with the alert tone port of the tone generator of the third computer 499. Also, the call control 313, in accordance with the predetermined logic, instructs connection of ports 10 and 20 and issues control signals 718, 719 to the switch 314 to connect ports 10 and 20.

The switch apparatus interprets the control signals 718, 719 to connect ports 10 and 20 by transmitting an instruction signal to port 10 of the first computer 410 at address A to connect the first computer 410 across the LAN 400 with the port 20 of the second computer 420 at address B. The instruction signal sent to the first computer 410 comprises an address header signal element, address A which delivers the instruction signal from the switch to the first computer, an instruction signal element to the first computer to connect with the port 20 of the second computer, connect port 20, and an address of the second computer, address 20, which is supplied so that the first computer is capable of implementing the connection across the LAN 400 with the second computer at address B. The switch apparatus 314 also sends to the second computer 420 an instruction signal to the second computer to connect across the LAN 400 with the first computer (a connect port 10 signal element).

The instruction signal 721 sent to the second computer comprises an address signal, header address B, an instruction, connect port 10, instructing the second computer to connect communications channel over the LAN 400 with the port 10 of the first computer, and an address of the first computer, address A, supplied so that the second computer is capable of communicating with the first computer. At the end of the set up procedure described here above, the first and second computers are in direct communication with each other over the LAN 400 for Internet phone services, comprising the sending and receiving of packetized telephone frequency signals.

Figure 15:
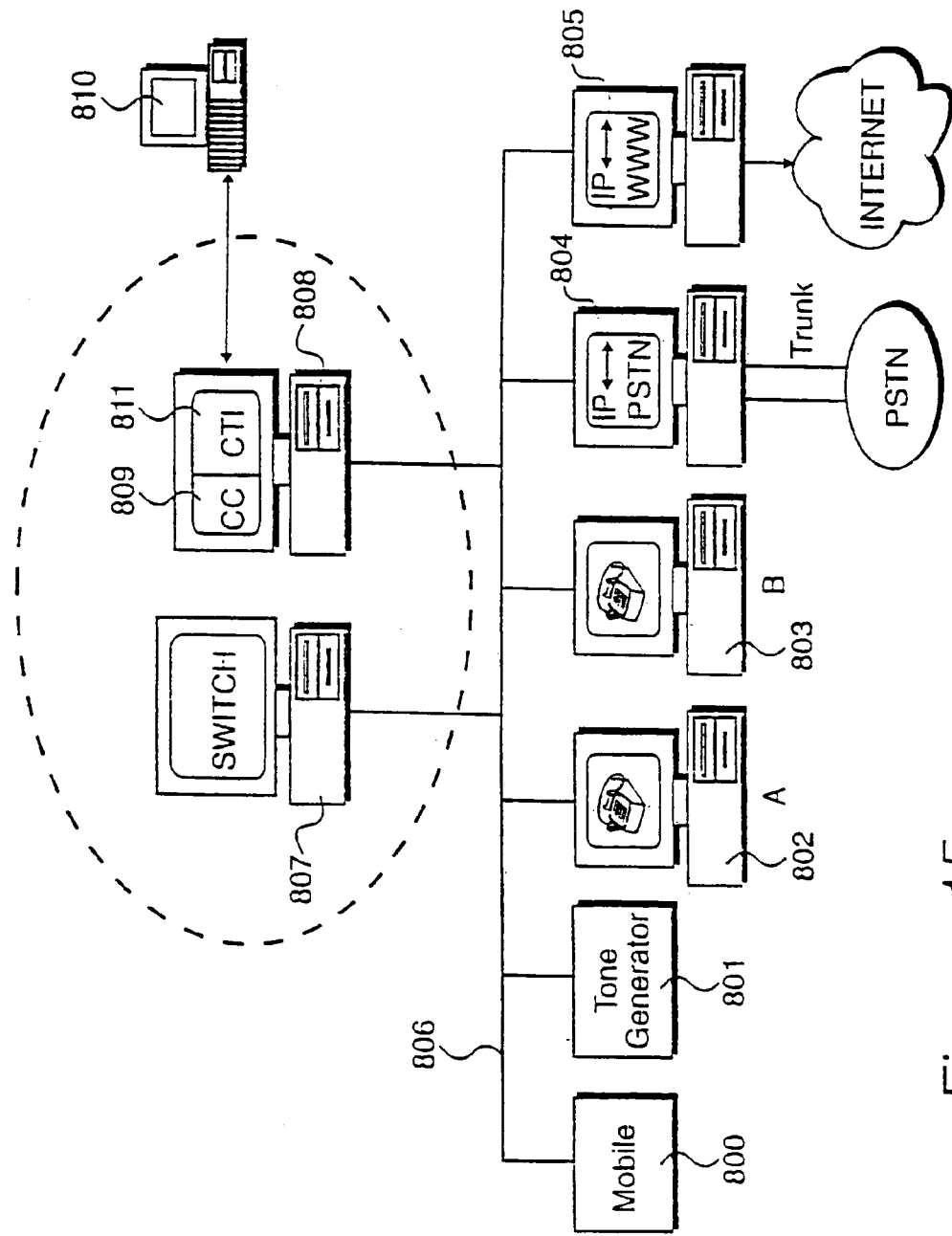
FIG. 15 illustrates a second communications network according to a second specific embodiment of the present invention.

Referring to FIG. 15, a second specific embodiment according to the present invention is described. A communications network comprises a plurality of computers 800–805 connected to a LAN 806 and capable of communicating with each other on a point-to-point basis in accordance with conventional network protocols. Each computer is assigned a port identification, for example computer 802 may be assigned to port 10 at ethernet address location A and computer 803 may be assigned a port 20 at ethernet address location B. Other computers 800, 801, 804, 805 are also assigned port identifiers and corresponding network addresses in the form of stored port identifier and port address signals.

A communications exchange apparatus for connecting communications between the plurality of computers 800–806 is resident on a switch server computer 807 connected to the LAN 806, and having its own port identifier and network port location address. A call control apparatus, comprising the communications exchange is resident as a call control server on another computer 808 having its own network address. The call control server may exchange control signals with the switch server over the LAN 806. The switch server may send and receive instruction signals to the plurality of computers 800–805 over the LAN 806. Each computer registers its port identifier and its network port location address(es) with the switch server 807.

The call control 808 controls the routing and connection of communications calls between the plurality of computers 800–805 by sending and receiving control signals to and from ports registered with the switch server 807. The switch server 807 matches the port identifiers in the control signals with the computer network port location addresses and communicates with the computers by instruction signals sent to the network port location addresses. The switch server maintains a register of port identifiers of each computer registered with the switch server, and their corresponding network location addresses. The call control may implement operations in response to instructions from an external computer 810, or may send information on routing of calls to an external computer 810, which is interfaced with the call control via a computer telephony integration unit 811.

Operation of the control signals and instruction signals is substantially similar to that described herein above with reference to the first embodiment. Communication between individual computers, for example computer 802 at network address a may be made to another computer off the LAN via a gateway port resident on a gateway server for example gateway server 805.

Gateway server 805 allows access to the Internet by acting as a port which registers its port identification and port address with the switch server 807. A first computer 802 may communicate with a computer off the LAN through the Internet by registering with the switch server 807 and initiating a call to the gateway port of the server 805. The address of the gateway port is maintained at the switch server 807, and connection of the first computer 802 with the Internet server 805 is determined by the call control 809 and implemented through the instruction signals.

The Internet gateway server 805 encapsulates packet signals received from computer 802 in IP protocol signal headers and transmits them over the Internet to a destination computer. Similarly, return packet signals received from the destination computer on the Internet enter the LAN through the Internet gateway server 805 and are directed to the computer 802. The call control and switch server set up communication between the computer 802 and the destination computer on the Internet by making connection between the computer 802 and the Internet gateway server 805.

If the user of a first computer 802 wished to make a connection to another computer which did not exist, the address of the other computer would be collected as an instruction signal from the first computer 802 by the switch server 807. Since there would be no computer registered with the switch server 807 corresponding to the address sent by the first computer, in other words the destination computer did not exist, the switch server would be unable to supply a corresponding port identifier to the call control, and the call control logic would result in a control signal being sent from the call control to the switch server 807 resulting in an instruction signal being sent from the switch server to the first computer 802 instructing the first computer 802 that the destination computer was unavailable.

In another example of operation, a first computer 802 may access a computer attached to the public switched telephone network (PSTN) 812 via a trunk line, for example a Q931 or a DAS2 line connected to a PSTN server computer 804, connected to the LAN 806. The PSTN server 804 has a port identifier and a LAN address which are registered in memory locations of the switch server 807. Communication between the first computer 802 and the PSTN server 804 is made by the sending and receiving of instruction signals to the switch server, relaying of instructions and messages from the switch server to the call control server 809 as control signals, determining the connection of ports by the call control server 809 in accordance with logic stored by the call control server, and implementation of the connection of ports as connection of computers having Ethernet addresses by the sending and receiving of instruction signals between the first computer 802, the switch server 807 and the PSTN server 804, to make direct point-to-point connection over the LAN between the first computer 802 and the PSTN server 804. The PSTN server 804 receives packetized telephone frequency signals from the first computer 802, and converts these to a form suitable for sending over the PSTN to a destination device, eg another computer or a conventional telephone.

To access the PSTN, a first computer dials up the port number of a channel of the PSTN, resident on the PSTN server 804 which is sent to the switch server. The port identifier and address of the PSTN port are registered with the switch server. Connection of the first computer and the PSTN channel port is determined by call control as connection of ports, which is implemented by the switch substantially as described herein above.

In another example of operation, a mobile phone server computer 800 adapted to send and receive communications to a mobile phone has a port identifier and a location address, which are registered with the switch server 807 on a memory device of the switch server. A second computer 803, for example, which wishes to communicate with the mobile phone sends and receives instruction signals over the LAN 806 to the switch server 807 specifying an address or other identification of the mobile phone connected to the mobile phone server 800. The call control server 809 implements a connection between the second computer 803 and the mobile phone server 807 by control signals and instruction signals similarly as described herein above.

Connection between the second computer 803 and the mobile phone server 800 is made on a point-to-point basis for transmission of packetized telephone frequency signals over the LAN 806. As long as the mobile phone server 800 registers its point identifier and address with the switch server 807 the switch server will be able to make connection between the second computer, also registered with the switch server 807 and the mobile phone server 800, and hence the mobile phone.

In specific embodiments of the present invention, separation of the call control apparatus and the switch apparatus and communication between the switch apparatus and the call control apparatus by means of control signals may have an advantage of allowing interchange ability of call control apparatus. As long as the call control apparatus sends and receives control signals which are compatible with the switch apparatus interchange ability of different call control apparatus having different functions may be made on a single switch apparatus. For example, the British Telecommunications Meridian type private branch exchange (PBX) may communicate by way of control signals with the switch apparatus, allowing access of all conventional services and routing functions available on this Meridian call control to be implemented on a LAN, Intranet, Ethernet or the like.

In specific embodiments and methods according to the invention herein, there may be implemented personal numbering independent of computer location. An individual user may log in his or her personal number to a computer, which then registers that number along with a port identifier and port address on the switch apparatus. Calls received for that personal number may be directed through the port of the computer to which the personal number is logged on to.

Further, by implementing Internet addresses in the form of port identifiers, and by centralising the routing and provision of services in the call control and by implementing tone generators and Internet gateways and gateways to the PSTN as ports, the protocol between the switching apparatus and individual computers on a local area network may remain relatively simple, maintaining simplicity at each of the computers of the network other than the switch and call control.

The protocol may comprise the following basic elements of:
Phone to switch: off-hook\on-hook signal;
Switch to phone: collect address signal;
Phone to switch: supply collected address signal;
Switch to phone: connect to specified address;
Switch to phone: disconnect from specified address.

In an example of operation in which a conference is built between a plurality of Internet phones, in response to instructions received from a first phone, which initiates the conference, the call control directs by way of control signals the identified phones to disconnect connections between themselves and all connect to the switch apparatus. The switch apparatus builds routing bridges between the Internet phones at the switch, thereby implementing a conference. All packetized telephone frequency signals are sent to the switch port and redirected from the switch port to the respective corresponding Internet phones in the conference under control of call control, which issues control signals to the switch apparatus for implementing the direction of the packetized telephone frequency signals.

In the handling of service interactions, and conflicts, because all relevant phones register with the switch block, and the switch block sends messages on the status of the phones to the call control. Service interactions can be handled by the call control logic. The call control logic would be able to stop users making call transfers. Similarly, the call control apparatus would resolve any conflicts, for example is port 10 requested a 2M bit link to port 20 but port 20 could only support a 64 kbit link, if the data capacities of the ports were stored in the register of the switch apparatus, call control could resolve any conflicts using this stored information in the switch apparatus, which would be relayed to the call control by way of control signals from the switch block to the call control. The call control could prevent connection of unfeasible communications links between computers.

Further, since the switch port always exists on the network, if an Internet phone wishes to communicate with another Internet phone which does not exist or is unavailable, since this phone would not be registered with a switch apparatus, the call control could determine that the connection is not feasible and send the corresponding control signal, which is implemented as an instruction signal by the switch, back to the original Internet phone, informing the original phone that the required phone is out of service. Alternatively, the call control can implement a call divert to another phone which is registered with the switch apparatus.

In another mode of operation, Internet phone addresses can be implemented as names or short cut abbreviations. Conventional Internet phones identify each other by a URL coding. However, in the specific embodiments to the present invention, abbreviations and short cut names may be stored either at the switch apparatus or at the routing table memory, so that commonly used Internet addresses or personal numbers can be accessed by abbreviated short name addresses.

As disclosed above, the term "telephone frequency signals" embraces any of data, audio and video signals. Accordingly, the term "call" as used herein means any such communication between computers (302 to 307; 410, 420; 800, 802 to 805), and it will be appreciated that the user-associated computers (305 to 307; 410, 420; 802, 803) have an appropriate user interface.

What is claimed is:

1. In a network of processing devices arranged to communicate over an addressed packet-based data communication medium by using packetized messages having an addressing header and a data portion, a method of implementing an addressed point-to-point packet-based call, said method comprising:
  registering at a central location respective information defining telephony service specifications and current busy/free status for the processing devices;
  making a new call attempt from a source processing device to a destination processing device by sending a signalling message from that source processing device to the central location identifying that destination processing device;

determining from the registered information for that source processing device and for that destination processing device the further processing of that new call attempt; and, provided that the service for that source processing device is compatible with the service for that destination processing device and that the current busy/free status of that destination processing device is free, sending a signalling message from said central location to one of the source and destination processing devices identifying an address for the other of the source and destination processing devices; and thereafter conducting an addressed point-to-point packet-based call directly between the source and destination processing devices using the address communicated from the central location; and at the location, updating the registered information in response to receipt of status signaling messages from the processing devices indicating change in busy/free status.

2. A method as in claim 1, including sending a signalling packet from the central location to that destination processing device identifying that source processing device.

3. In a network of processing devices arranged to communicate over an addressed packet-based data communication medium by using packets having an addressing header and a data portion, a method of implementing an addressed point-to-point packet-based call, said method comprising:

storing at a central location respective information defining transmission data rate capabilities and current call status for the processing devices;

making a new call attempt from a source processing device to a destination processing device by sending a signalling packet from that source processing device to the central location identifying that destination processing device and requesting a particular transmission data rate for that new call attempt;

determining from the requested transmission data rate and the stored information for that source processing device and for that destination processing device the further processing of that new call attempt; and, provided that the requested transmission data rate is not greater than the transmission data rate capability of that destination processing device and that the current call status of that destination processing device permits that new call attempt, sending a signalling packet from said central location to one of said source and destination processing devices identifying an address for the other of said source and destination processing devices; and thereafter conducting an addressed point-to-point packet-based call directly between said source and destination processing devices using the address communicated from the central location.

4. A method as in claim 3, including sending a signalling packet from the central location to that destination processing device identifying that source processing device.

5. In a network of processing devices arranged to communicate over an addressed packet-based data communication medium by using packets having an addressing header and a data portion, a method of implementing an addressed point-to-point packet-based call, said method comprising:

storing at a central location respective information defining transmission data rate capabilities and current call status of the processing devices;

making a new call attempt from a source processing device to a destination processing device by sending a signalling packet from that source processing device to the central location identifying that destination processing device;

determining from the stored information for that source processing device and for that destination processing device the further processing of that new call attempt; and, provided that the transmission data rate capability of that source processing device is not greater than the transmission data rate capability of that destination processing device and that the current call status of that destination processing device permits that new call attempt, sending a signalling packet from said central location to one of said source and destination processing devices identifying an address for the other of said source and destination processing devices; and thereafter conducting an addressed point-to-point packet-based call directly between said source and destination processing devices using the address communicated from the central location.

6. A method as in claim 5, including sending a signalling packet from the central location to that destination processing device identifying that source processing device.

7. A central switching processor networked to a plurality of user processing devices, the processing devices being capable of sending and receiving packetized messages having an addressing header and a data portion over an addressed packet-based data communication medium directly between themselves, said central switching processor comprising:

means for registering for the processing devices respective information defining service specifications and current busy/idle status and for updating the registered status information in accordance with status signaling messages received from the processing devices as they change status from time to time;

means for registering for the processing devices respective information defining service specification and current busy/idle status and for updating the registered status information in accordance with status signaling messages received from a source processing device identifying a destination processing device for attempting a new call with that destination processing device;

means for determining registered service specification defining, providing that the status of the destination processing device is idle, from the information for the source processing device and for the destination processing device the further processing of the call attempt; and sending means responsive to a favourable outcome from the determining means for sending a signalling message via the communication medium to one of said source and destination processing devices identifying an address for the other of said source and destination processing devices.

8. A central switching processor as in claim 7, wherein said sending means is further responsive to said favourable outcome for sending a signalling packet to that destination processing device identifying that source processing device.

9. A central switching processor as in claim 7, wherein the determining means is arranged to determine whether the service for the source processing device is compatible with the service for the destination processing device; and said sending means is responsive to an unfavourable outcome from the determining means for sending a signalling packet to the source processing device rejecting the new call attempt.

10. A central switching processor networked to a plurality of user processing devices arranged to communicate over an addressed packet-based data communication medium, said central switching processor comprising:

means for storing respective transmission data rate capabilities and current telephony status for the processing devices;

means for receiving a signalling packet from a source processing device identifying a destination processing device for attempting a new call with that destination processing device and requesting a particular transmission data rate for the new telephony call;

means for determining whether the requested transmission data rate is greater than the transmission data rate capability of the destination processing device; and sending means responsive to a favourable outcome from the determining means for sending a signalling packet to one of said source and destination processing devices identifying an address for the other of said source and destination processing devices.

11. A central switching processor as in claim 10, wherein said sending means is further responsive to said favourable outcome for sending a signalling packet from the central location to that destination processing device identifying that source processing device.

12. A central switching processor as in claim 10, wherein said sending means is responsive to an unfavourable outcome from the determining means for sending a signalling packet to the source processing device rejecting the new call attempt.

13. A central switching processor networked to a plurality of user processing devices arranged to communicate over an addressed packet-based data communication medium, said central switching processor comprising:

means for storing respective transmission data rate capabilities and current call status of the processing devices;

means for receiving a signalling packet from a source processing device to the central location identifying a destination processing device for attempting a new telephony call with that destination processing device;

means for determining whether the transmission data rate capability of the source processing device is greater than the transmission data rate capability of the destination processing device; and sending means responsive to a favourable outcome from the determining means for sending a signalling packet to one of said source and destination processing devices identifying an address for the other of said source and destination processing devices.

14. A central switching processor as in claim 13, wherein the sending means is responsive to an unfavourable outcome from the determining means for sending a signalling packet to the source processing device rejecting the new call attempt.

15. A method of conducting a session of an Internet telephone service using packetized telephone frequency signals over an addressed packet-based data communication network between data processing devices connected to the network, the processing devices either having a user interface or being a gateway server giving access to remote communication devices, the processing devices being adapted to send signaling packets to a communications exchange apparatus also connected to the communication network, and the communications exchange apparatus being adapted to maintain a register of the respective network addresses of the processing devices and their respective identities, the method comprising:

a set up phase comprising:

responding by the communications exchange apparatus to receipt from a source processing device of a signaling packet containing an identity for a destination processing device with which the source processing device desires to conduct a session of the Internet telephone service by determining from the register the network address of the identified destination processing device, and communicating the network address of one of the source processing device and identified destination processing device to the other of the source processing device and the identified destination processing device, and a subsequent session phase comprising:

sending packetized telephone frequency signals of the Internet telephone service directly between the source processing device and the identified destination processing device over the communication network, said one of the source processing device and the identified destination processing device using the network address communicated from the communications exchange apparatus during the set up phase; and wherein the respective current busy/idle status of each processing device is maintained in the register, the set up phase further comprises responding by the communications exchange apparatus to receipt from the processing devices of signaling packets containing an indication of a change of busy/idle status by updating the register, and the communications exchange apparatus also determines from the register the current busy/idle status of the identified destination processing device and communicates the network address only if the current busy/idle status of the identified destination processing device is idle.

\* \* \* \* \*